(12) United States Patent
Franklin et al.

(10) Patent No.: US 9,805,630 B2
(45) Date of Patent: Oct. 31, 2017

(54) LIGHT GUIDE STRUCTURES FOR DISPLAY BACKLIGHTS

(75) Inventors: Jeremy C. Franklin, San Francisco, CA (US); Derek Wright, San Francisco, CA (US); Jun Qi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 303 days.

(21) Appl. No.: 13/417,155

(22) Filed: Mar. 9, 2012

(65) Prior Publication Data

US 2013/0235611 A1 Sep. 12, 2013

(51) Int. Cl.
*G02B 6/00* (2006.01)
*G09F 13/04* (2006.01)
*F21V 8/00* (2006.01)

(52) U.S. Cl.
CPC ............. *G09F 13/04* (2013.01); *G02B 6/009* (2013.01); *G02B 6/0028* (2013.01); *G02B 6/0073* (2013.01); *G02B 6/0085* (2013.01)

(58) Field of Classification Search
CPC ...... G02B 6/0028; G02B 6/0025; G09F 13/04
USPC .................................. 362/601, 606, 607, 616
See application file for complete search history.

(56) References Cited

U.S. PATENT DOCUMENTS

| | | | |
|---|---|---|---|
| 5,808,708 A * | 9/1998 | Oyama et al. ................... | 349/65 |
| 7,543,973 B2 | 6/2009 | Shimura | |
| 7,812,900 B2 | 10/2010 | Hung et al. | |
| 8,049,839 B2 | 11/2011 | Han et al. | |
| 8,061,884 B2 | 11/2011 | Harbers et al. | |
| 8,118,470 B2 | 2/2012 | Niu | |
| 2001/0019479 A1 | 9/2001 | Nakabayashi | |
| 2002/0141201 A1* | 10/2002 | Shimura et al. ............... | 362/558 |
| 2003/0103729 A1* | 6/2003 | Ishida ............................. | 385/49 |
| 2003/0202336 A1* | 10/2003 | Ostergard et al. .............. | 362/24 |
| 2006/0007702 A1* | 1/2006 | Hsieh et al. ................... | 362/611 |
| 2007/0058391 A1* | 3/2007 | Wilson et al. ................. | 362/606 |

(Continued)

FOREIGN PATENT DOCUMENTS

| | | |
|---|---|---|
| CN | 101140379 A | 3/2008 |
| CN | 101147029 A | 3/2008 |

(Continued)

OTHER PUBLICATIONS

Garelli et al. U.S. Appl. No. 13/332,228, filed Dec. 20, 2011.

*Primary Examiner* — Sean Gramling
*Assistant Examiner* — Gerald J Sufleta, II
(74) *Attorney, Agent, or Firm* — Treyz Law Group, P.C.; G. Victor Treyz; Joseph F. Guihan

(57) ABSTRACT

An electronic device may have a display with backlight structures. The backlight structures may produce backlight that passes through the display layers in the display. The backlight structures may include a light guide plate that distributes light across the display layers. A light source such as a light-emitting diode light source may be used to provide light to the light guide plate. The light source may overlap an edge portion of the light guide plate. A light guide structure having a bend may be coupled between the light source and the light guide plate. The light guide structure may be used to guide the light from the light source to the light guide plate via total internal reflection. A light guide structure may be provided with light leakage promotion structures to evenly distribute light from a centralized light source along the edge of a light guide plate.

18 Claims, 16 Drawing Sheets

(56) References Cited

U.S. PATENT DOCUMENTS

| | | | |
|---|---|---|---|
| 2007/0064417 A1* | 3/2007 | Hatanaka et al. | 362/231 |
| 2007/0102482 A1* | 5/2007 | Baleras et al. | 228/101 |
| 2007/0153539 A1* | 7/2007 | Mikami | 362/561 |
| 2007/0274098 A1* | 11/2007 | Wheatley et al. | 362/609 |
| 2008/0084707 A1* | 4/2008 | Blumstein et al. | 362/606 |
| 2008/0316603 A1* | 12/2008 | Jang et al. | 359/599 |
| 2009/0040786 A1 | 2/2009 | Mori | |
| 2009/0167651 A1 | 7/2009 | Minano et al. | |
| 2010/0118563 A1 | 5/2010 | Shen et al. | |
| 2010/0157619 A1* | 6/2010 | Chinniah et al. | 362/551 |
| 2010/0195022 A1* | 8/2010 | Shikii et al. | 349/65 |
| 2010/0265696 A1* | 10/2010 | Ho | G02F 1/133615 362/97.3 |
| 2010/0273530 A1* | 10/2010 | Jarvis | F16F 1/027 455/566 |
| 2010/0309610 A1* | 12/2010 | Wippler | H05K 5/0017 361/679.01 |
| 2010/0321953 A1* | 12/2010 | Coleman et al. | 362/607 |
| 2011/0002141 A1* | 1/2011 | Chang | 362/606 |
| 2011/0032729 A1* | 2/2011 | Duong et al. | 362/607 |
| 2011/0036693 A1* | 2/2011 | Lin et al. | 200/314 |
| 2011/0128255 A1* | 6/2011 | Feng et al. | 345/175 |

FOREIGN PATENT DOCUMENTS

| | | |
|---|---|---|
| CN | 101308780 | 11/2008 |
| CN | 101529156 A | 9/2009 |
| CN | 202082726 U | 12/2011 |
| CN | 102563469 A | 7/2012 |
| EP | 2336812 | 6/2011 |
| JP | H9-230338 A | 9/1997 |
| JP | 2006-278096 A | 10/2006 |
| JP | 2007-66719 | 3/2007 |
| JP | 2010-032923 | 2/2010 |
| JP | 2010-67390 | 3/2010 |
| JP | 2010-238483 A | 10/2010 |
| KR | 10-2011-0057528 | 6/2011 |
| TW | 200848809 | 12/2008 |
| TW | 201102714 | 1/2011 |
| TW | 201122622 | 7/2011 |
| WO | 02/097324 | 12/2002 |

\* cited by examiner

LIGHT GUIDE STRUCTURES FOR DISPLAY BACKLIGHTS

BACKGROUND

This relates generally to electronic devices and, more particularly, to electronic devices with displays and associated backlight structures.

Electronic devices such as computers and cellular telephones have displays. Some displays such as plasma displays and organic light-emitting diode displays have arrays of display pixels that generate light. In displays of this type, backlighting is not necessary because the display pixels themselves produce light. Other displays contain passive display pixels that can alter the amount of light that is transmitted through the display to display information for a user but do not produce light themselves. As a result, it is often desirable to provide backlight for a display with passive display pixels.

In a typical backlight assembly for a display, a strip of light-emitting diodes is located along an edge of a light guide plate. Light is launched from the strip of light-emitting diodes into the light guide plate, and the light guide plate is used to distribute the light across the display. The strip of light-emitting diodes is often mounted under an inactive portion of a display.

Ensuring that there is sufficient space to accommodate light-emitting diodes at the edge of a light guide plate may require a significant amount of inactive display area at the border of a display. This type of wide inactive border may be aesthetically unappealing and may reduce the amount of active display area that is available to display images for a user.

It would therefore be desirable to be able to provide electronic devices with improved arrangements for backlighting displays.

SUMMARY

A backlight assembly may be provided for producing backlight illumination for a display. The backlight assembly may include a light guide plate. The light guide plate may have an upper surface through which backlight is provided to the underside of the display.

A light source may be configured to provide light to the light guide plate. The light source may include one or more light-emitting diodes. The light-emitting diodes may be mounted on a flexible substrate. Conductive traces may be formed on the flexible substrate and may be used to supply power to the light-emitting diodes.

A light guide structure may be coupled between the light source and the light guide plate. The light guide structure may be configured to receive the light from the light source and to guide the light to the light guide plate via total internal reflection.

The light source may overlap an edge portion of the light guide plate. The light guide structure may have a U-shaped bend to redirect light from the light source to the light guide plate.

The light source may be oriented perpendicular to the light guide plate. The light guide structure may have an L-shaped bend to redirect light from the light source to the light guide plate.

An elongated light guide structure may be coupled to an edge of a light guide plate. The light guide structure may have a length that runs parallel to the edge of the light guide plate. A light source may be coupled to an end of the light guide structure. Light may be emitted from the light source into the end of the light guide structure and may be guided within the light guide structure via total internal reflection.

The light guide structure may be provided with light leakage promotion structures. The light leakage promotion structures may be configured to promote light leakage from the light guide structure into the light guide plate.

The light leakage promotion structures may be non-uniform along the length of the light guide structure. The light leakage promotion structures may vary in density, shape, and/or size along the length of the light guide structure. A transparent adhesive may be interposed between the edge of the light guide plate and the light guide structure.

A plurality of light guides may be used to guide light from a plurality of light sources to a light guide plate. Each light source may emit a portion of the light into a respective one of the light guides. The plurality of light guides may have respective ends coupled to the edge of the light guide plate and may guide the light to the edge of the light guide plate via total internal reflection. The plurality of light guides may be formed from optical waveguides that run next to each other along a substrate or may be formed from optical fibers.

A display may be mounted in an electronic device housing. One or more electronic components may be mounted in the housing. A backlight assembly may be used to provide backlight to the display. The backlight assembly may include a light guide plate and a plurality of light sources. A light guide structure may have first and second opposing edges. The first edge may be coupled to an edge of the light guide plate and the second edge may be coupled to the plurality of light sources. The light guide structure may be used to guide the light from the light sources to the light guide plate via total internal reflection.

The light guide structure may have a bend. The bend in the light guide structure may allow an electronic component such as a button to overlap the light sources.

Further features of the invention, its nature and various advantages will be more apparent from the accompanying drawings and the following detailed description of the preferred embodiments.

DETAILED DESCRIPTION

A display may be provided with backlight structures. The backlight structures may produce backlight for the display that helps a user of a device view images on the display in a variety of ambient lighting conditions. Displays with backlights may be provided in any suitable type of electronic equipment.

Figure 1:
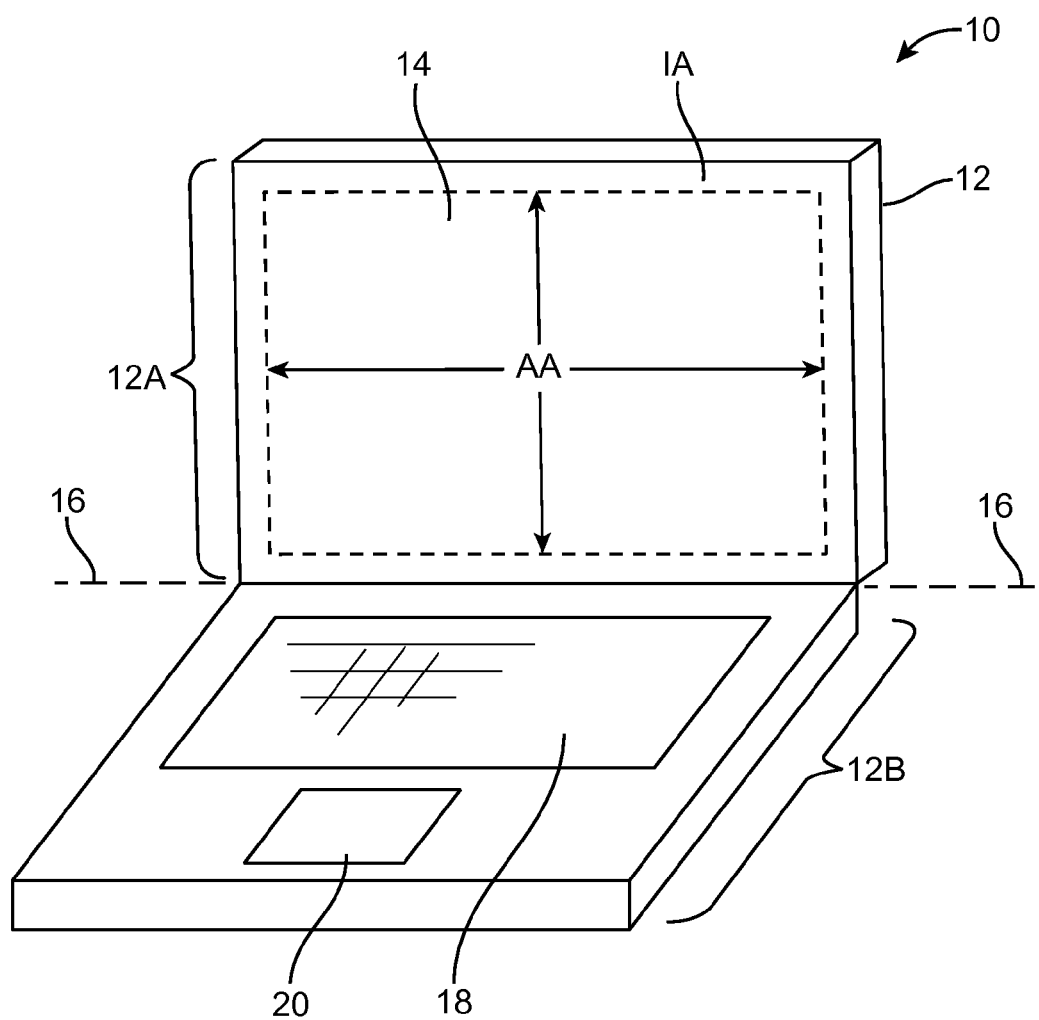
FIG. 1 is a diagram of an illustrative electronic device such as a portable computer having a backlit display in accordance with an embodiment of the present invention.

An illustrative electronic device of the type that may be provided with a backlit display is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a backlit display such as display 14. Display 14 may be a touch screen that incorporates capacitive touch electrodes or other touch sensor components or may be a display that is not touch-sensitive. Display 14 may include image pixels formed from liquid crystal display (LCD) components or other suitable display pixel structures. Arrangements in which display 14 is formed using liquid crystal display pixels are sometimes described herein as an example. This is, however, merely illustrative. Any suitable type of display technology may be used to form display 14 if desired (e.g., electrowetting display technology, electrophoretic display technology, etc.).

Device 10 may have a housing such as housing 12. Housing 12, which may sometimes be referred to as a case, may be formed of plastic, glass, ceramics, fiber composites, metal (e.g., stainless steel, aluminum, etc.), other suitable materials, or a combination of any two or more of these materials.

Housing 12 may be formed using a unibody configuration in which some or all of housing 12 is machined or molded as a single structure or may be formed using multiple structures (e.g., an internal frame structure, one or more structures that form exterior housing surfaces, etc.).

As shown in FIG. 1, housing 12 may have multiple parts. For example, housing 12 may have upper portion 12A and lower portion 12B. Upper portion 12A may be coupled to lower portion 12B using a hinge that allows portion 12A to rotate about rotational axis 16 relative to portion 12B. A keyboard such as keyboard 18 and a touch pad such as touch pad 20 may be mounted in housing portion 12B.

Display 14 may have an active area such as active area AA and an inactive area such as area IA. Active area AA may be, for example, a rectangular region in the center of display 14 in which display pixels are actively used to display images for a user of device 10. Inactive area IA may be devoid of active display pixels. In the example of FIG. 1, inactive area IA has the shape of a rectangular ring that surrounds active area AA of display 14.

Circuitry and components may sometimes be formed under the inactive area IA of display 14. To hide the circuitry and other components from view of a user of device 10, inactive area IA may be provided with an opaque mask. The opaque mask can be formed from an opaque material such as a black pigmented polymer material or may be formed from opaque masking materials of other colors. Configurations in which the opaque masking material in display 14 has a black appearance are sometimes described herein as an example. This is, however, merely illustrative. Opaque masking material in device 10 may have any suitable color.

Figure 2:
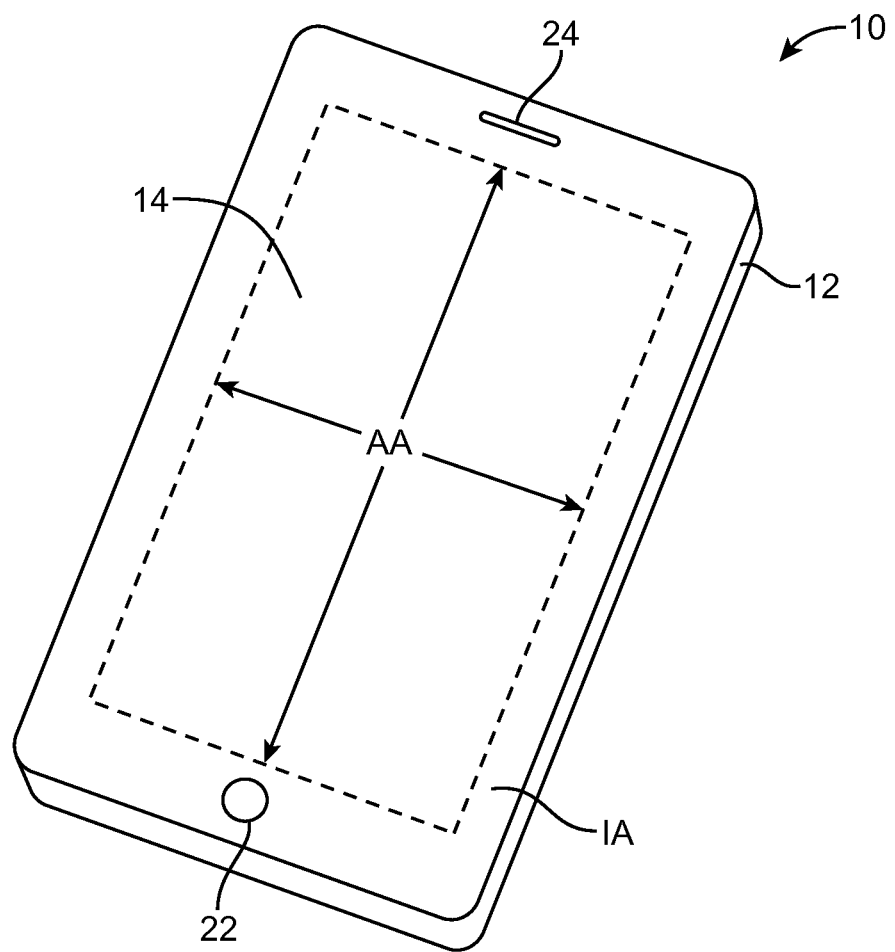
FIG. 2 is a diagram of an illustrative electronic device such as a cellular telephone or other handheld device having a backlit display in accordance with an embodiment of the present invention.

In the example of FIG. 2, device 10 has been implemented using a housing that is sufficiently small to fit within a user's hand (i.e., device 10 of FIG. 2 may be a handheld electronic device such as a cellular telephone). As show in FIG. 2, device 10 may include a backlit display such as display 14 mounted on the front of housing 12. Display 14 may be substantially filled with active display pixels or may have an inactive portion such as inactive portion IA that surrounds an active portion such as active portion AA. Display 14 may have openings (e.g., openings in inactive region IA or in active region AA of display 14) such as an opening to accommodate button 22 and an opening to accommodate speaker port 24.

Figure 3:
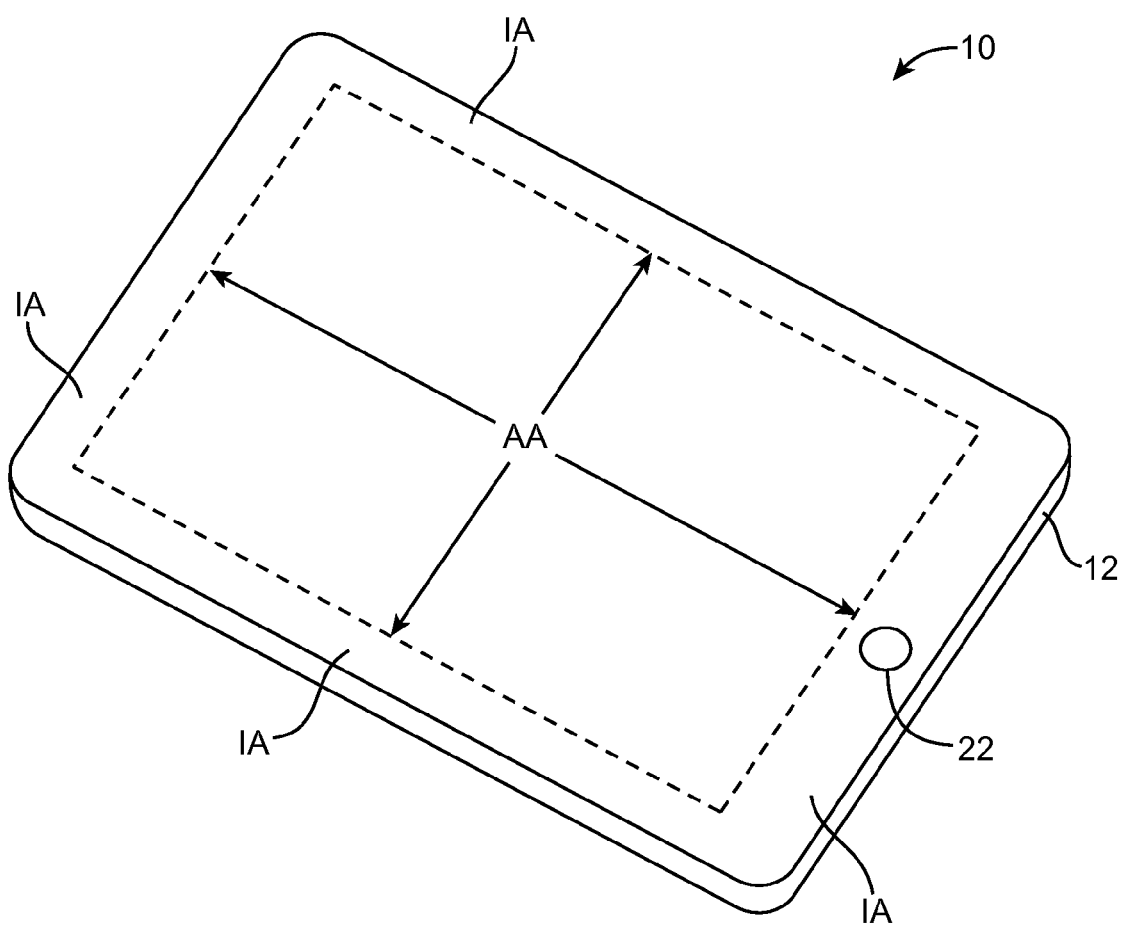
FIG. 3 is a diagram of an illustrative electronic device such as a tablet computer having a backlit display in accordance with an embodiment of the present invention.

FIG. 3 is a perspective view of electronic device 10 in a configuration in which electronic device 10 has been implemented in the form of a tablet computer. As shown in FIG. 3, backlit display 14 may be mounted on the upper (front) surface of housing 12. An opening may be formed in display 14 to accommodate button 22 (e.g., in inactive region IA surrounding active region AA).

Figure 4:
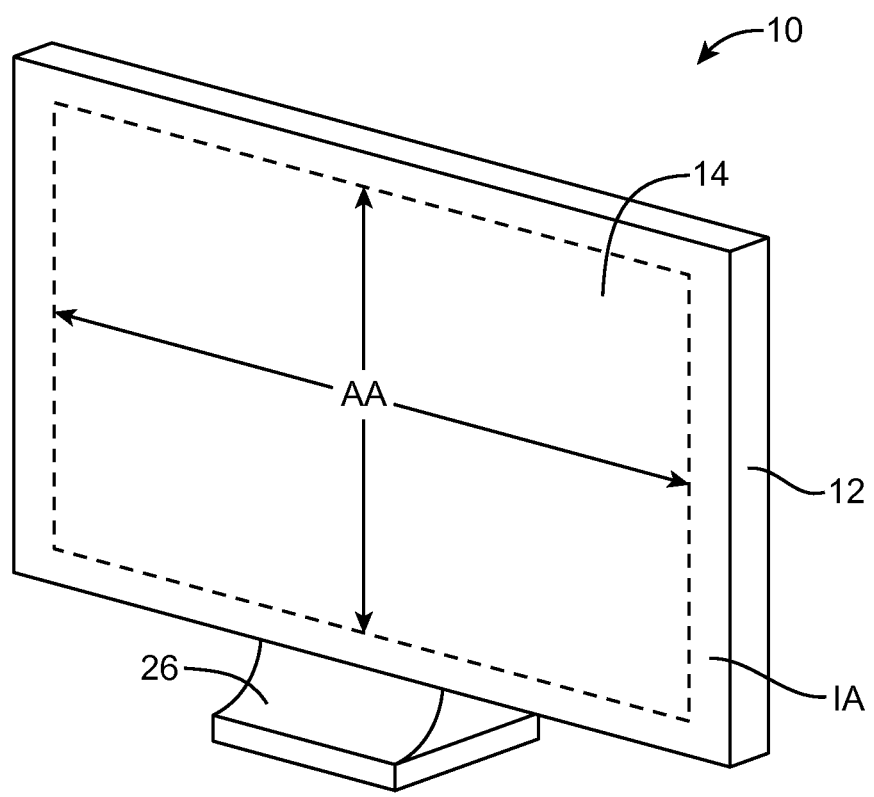
FIG. 4 is a diagram of an illustrative electronic device such as a computer monitor with a built-in computer having a backlit display in accordance with an embodiment of the present invention.

FIG. 4 is a perspective view of electronic device 10 in a configuration in which electronic device 10 has been implemented in the form of a computer integrated into a computer monitor. As shown in FIG. 4, backlit display 14 may be mounted on the front surface of housing 12. Stand 26 may be used to support housing 12. Display 14 may include an inactive region such as inactive region IA that surrounds active region AA.

Figure 5:
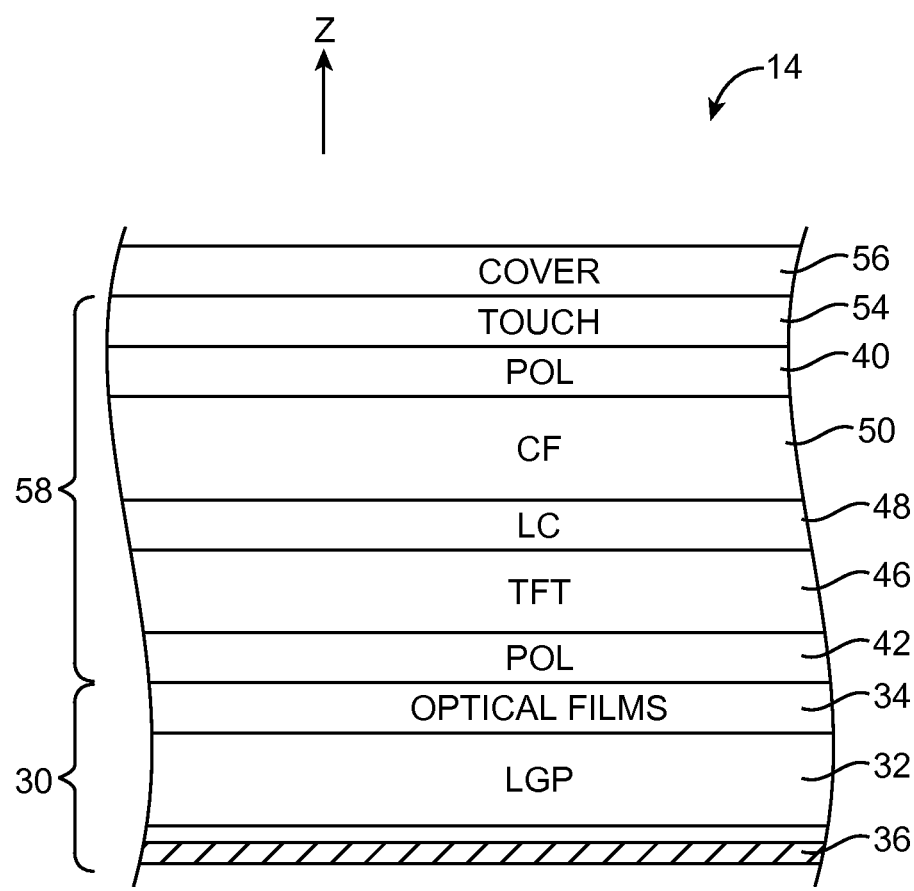
FIG. 5 is a cross-sectional side view of an illustrative backlit display in accordance with an embodiment of the present invention.

A cross-sectional side view of display 14 is shown in FIG. 5. As shown in FIG. 5, display 14 may include backlight structures 30 and display layers 58. Backlight structures 30 may include a light guide plate such as light guide plate 32, optical films such as optical films 34, and a reflector such as reflector 36. During operation, a light source such as a light-emitting diode light source may emit light into light guide plate 32. Light guide plate 32 may be formed from a sheet of clear acrylic or other transparent polymer. Light may travel within light guide plate 32 by means of total internal reflection. Light that escapes through the upper surface of light guide plate 32 may pass through overlying display layers 58 in direction z and may serve as backlight for display 14. Light that escapes through the lower surface of light guide plate 32 may be reflected by reflector 36 and redirected upwards in direction z. Reflector 36 may be formed from a reflective material such as white plastic (as an example). Optical films 34 may include brightness enhancing film layers, diffusing film layers, and compensating film layers (as examples).

Display 14 may have an upper polarizer layer such as polarizer layer 40 and a lower polarizer layer such as polarizer layer 42. Polarizer layer 42 may polarize backlight 44. Thin-film transistor (TFT) layer 46 may include a layer of thin-film transistor circuitry and an array of associated pixel electrodes. Pixel structures such as thin-film transistor structures and associated pixel electrodes in the array of pixel electrodes on thin-film transistor layer 46 may produce electric fields corresponding to image data to be displayed. The electric field produced by each electrode on thin-film transistor layer 46 adjusts the orientation of liquid crystals in an associated portion of liquid crystal layer 48 by a corresponding amount. As light travels through display 14, the adjustment of the orientation of the liquid crystals adjusts the polarization of the light that passes through layer 48. When this light reaches upper polarizer 40, the polarization state of each pixel of light is attenuated by an amount that is proportional to its polarization, thereby creating visible images for a user.

Color filter layer 50 may contain an array of colored pixels (e.g., an array of red, blue, and green color filter elements) for providing display 14 with the ability to form color images. If desired, a sealant may be used to seal color filter layer 50 to thin-film transistor layer 46 and to retain liquid crystal material 48 within display 14.

Display 14 may include a touch-sensitive layer such as touch-sensitive layer 54 for receiving touch input from a user of device 10. Touch-sensitive layer 54 may include a pattern of indium tin oxide (ITO) electrodes or other suitable transparent electrodes that have been deposited to form a capacitive touch sensor array. Touch-sensitive layer 54 may, in general, be configured to detect the location of one or more touches or near touches on touch-sensitive layer 54 based on capacitive, resistive, optical, acoustic, inductive, or mechanical measurements, or any phenomena that can be measured with respect to the occurrence of the one or more touches or near touches in proximity to touch-sensitive layer 54. If desired, touch-sensitive layer 54 may be incorporated into thin-film transistor layer 46 (e.g., display pixel electrodes and capacitive touch electrodes may be formed on a common substrate). The example of FIG. 5 in which touch-sensitive layer 54 is separate from thin-film transistor layer 46 is merely illustrative.

If desired, additional layers may be included in display 14. An optional layer of transparent glass or plastic may be used to provide a protective cover for display 14, as illustrated by cover layer 56 of FIG. 5.

Figure 6:
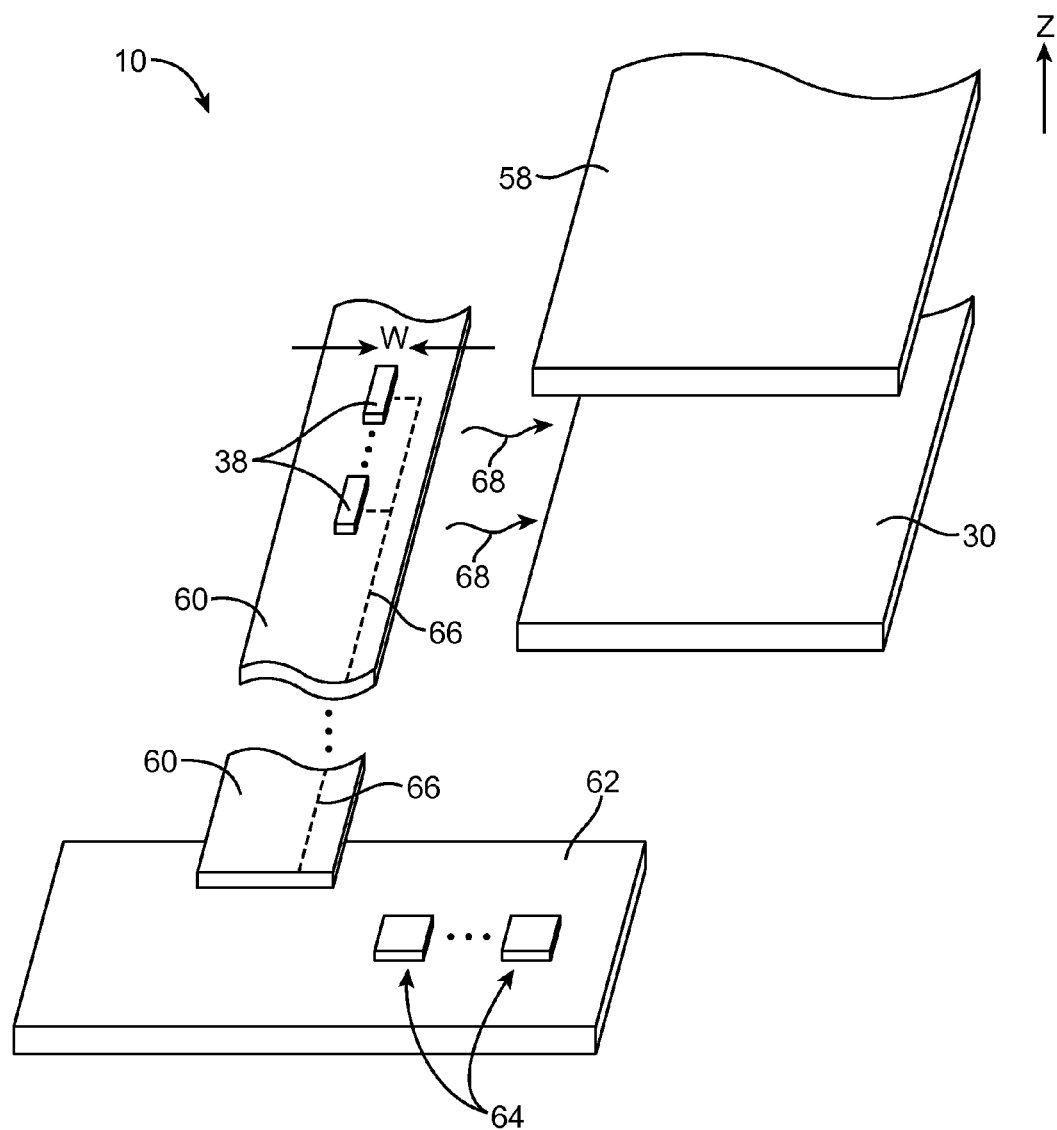
FIG. 6 is an exploded perspective view of a portion of an illustrative electronic device having display structures, backlight structures, and an associated printed circuit in accordance with an embodiment of the present invention.

FIG. 6 is an exploded perspective view of an assembly that includes display layers 58, backlight structures 30, and light sources for providing backlight to backlight structures 30. As shown in FIG. 6, a plurality of light sources such as light sources 38 may be mounted on a substrate such as substrate 60. Light sources 38 may be formed from a plurality of light-emitting diodes that are arranged in a row along the length of substrate 60. Substrate 60 may be a flexible printed circuit ("flex circuit") formed from one or more flexible sheets of polymer such as a polyimide. Conductive traces may be formed on and/or within substrate 60 (e.g., using copper or other metals). If desired, each light-emitting diode 38 on substrate 60 may be soldered to an associated trace 66. During operation, power may be provided to light-emitting diodes 38 via traces 66.

Substrate 60 may be coupled to a printed circuit such as printed circuit 62. Printed circuit 62 may be a rigid printed circuit board formed from material such as fiberglass-filled epoxy (e.g., FR4), may be a flexible printed circuit ("flex circuit") formed from one or more flexible sheets of polymer such as polyimide, or may be formed from materials such as ceramic, plastic, glass, etc. If desired, printed circuit 62 may be formed from a combination of rigid and flexible layers (sometimes referred to as a "rigid-flex" printed circuit). Substrate 60 may be attached to printed circuit 62 using a connector, using solder, or using any other suitable type of attachment method.

Integrated circuits, discrete components such as resistors, capacitors, and inductors, and other electronic components such as components 64 may be mounted to printed circuit 62. If desired, components such as components 64 may be used to supply control signals to light sources 38 via traces 66 (as an example).

During operation, light sources 38 may be used to emit light 68 into backlight structures 30 (e.g., into light guide plate 32 of FIG. 5). Backlight structures 30 may be used to distribute light 68 uniformly across display layers 58 in direction z.

In a conventional backlight assembly, light-emitting diodes are positioned along the edge of a light guide plate and are typically located under an inactive portion of a display. Accommodating light-emitting diodes at the edge of a light guide plate may require a significant amount of inactive display area. For example, a width such as width W may be required to accommodate light-emitting diodes at the edge of a light guide plate. Additionally, a "mixing distance" is required for the light from discrete light sources to become uniform. Providing sufficient space for light mixing at the edge of a light guide plate requires additional inactive display area at the edge of a display. Positioning light-emitting diodes at the edge of a light guide plate may therefore result in an undesirable amount of inactive display area around the border of a display.

To minimize the amount of inactive display area around the border of a display, light sources may be positioned in a space-efficient location and an auxiliary light guide structure may be used to route light from the light sources to the light guide plate. For example, light sources may be located above the light guide plate, may be located below the light guide plate, or may be located in a centralized location that does not necessitate the use of additional inactive display area.

In discussing the structures that may be used in electronic device 10, certain structures are sometimes said to be "above" or "below" other structures. A structure that is above another structure may be closer to the front surface of electronic device 10 than that structure. A structure that is below another structure may be closer to the rear or back surface of electronic device 10 than that structure.

Figure 7:
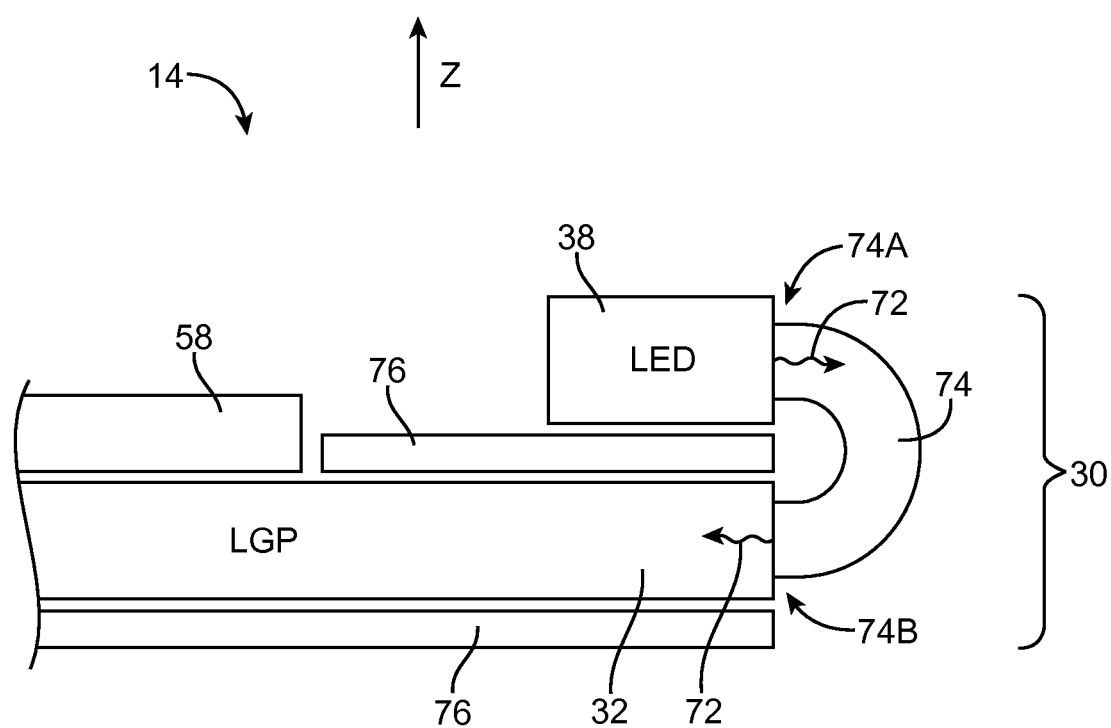
FIG. 7 is a cross-sectional side view of an illustrative backlight arrangement in which a light source is stacked above a light guide plate so that the light source overlaps an edge portion of the light guide plate in accordance with an embodiment of the present invention.

FIG. 7 is a cross-sectional side view of a backlight assembly in which a light source such as light source 38 is located above a light guide plate such as light guide plate 32 (e.g., in which light source 38 is located on the same side of light guide plate 32 as display layers 58). As shown in FIG. 7, light source 38 overlaps an edge portion of light guide plate 32 and emits light 72 into an auxiliary light guide structure such as light guide structure 74. Light guide structure 74 may be used to route light 72 from light source 38 to light guide plate 32.

Light guide structure 74 may be formed as an integral part of light guide plate 32 or may be formed as a separate structure that is coupled to light guide plate 32. Light guide structure 74 may be formed from a material such as plastic that has been molded, formed, or machined into a curved shape. In the example of FIG. 7, light guide structure 74 has a U-shaped bend (e.g., makes a 180° turn) and is configured to redirect light 72 (initially directed away from light guide plate 32) towards light guide plate 32. Light 72 may be reflected at the walls of light guide structure 74 and may be guided towards light guide plate 32 by means of total internal reflection. Light 72 that is launched into light guide plate 32 from light guide structure 74 may then be distributed across display layers 58 in direction z to serve as backlight for display 14.

A plurality of light sources 38 may be used to provide backlight for display 14. For example, a plurality of light-emitting diodes 38 may be coupled to end 74A of light guide structure 74 and may be used to provide backlight for display 14. To ensure that backlight is evenly distributed across display 14, a mixing distance may be provided to allow light from discrete light sources (e.g., light from individual light-emitting diodes) to become uniform. Light guide structure 74 may provide sufficient mixing distance for light 72 from individual light sources 38 to mix and become uniform as it propagates from end 74A to opposing end 74B of light guide structure 74.

Light guide plate 32 may be mounted within an optional support structure such as support structure 76. Support structure 76 (sometimes referred to as a chassis or mechanical chassis) may be formed from materials such as plastic, ceramic, fiber composites, metal, or other suitable materials. If desired, display 14 may be formed by mounting backlight structures 30 directly within housing 12 or by mounting backlight structures 30 in support structures of other shapes. In the illustrative configuration of FIG. 7, support structure 76 is used in forming a backlight assembly for display 14 that may be mounted within housing 12 under a display cover layer such as display cover layer 56 of FIG. 5. Other mounting configurations may be used, if desired.

Support structure 76 may be formed from a thermally conductive material and may be used as a heat sink for light-emitting diodes 38. If desired, there may be additional heat sinks in the vicinity of backlight structures 30 that may be used to transfer heat away from display 14.

Figure 8:
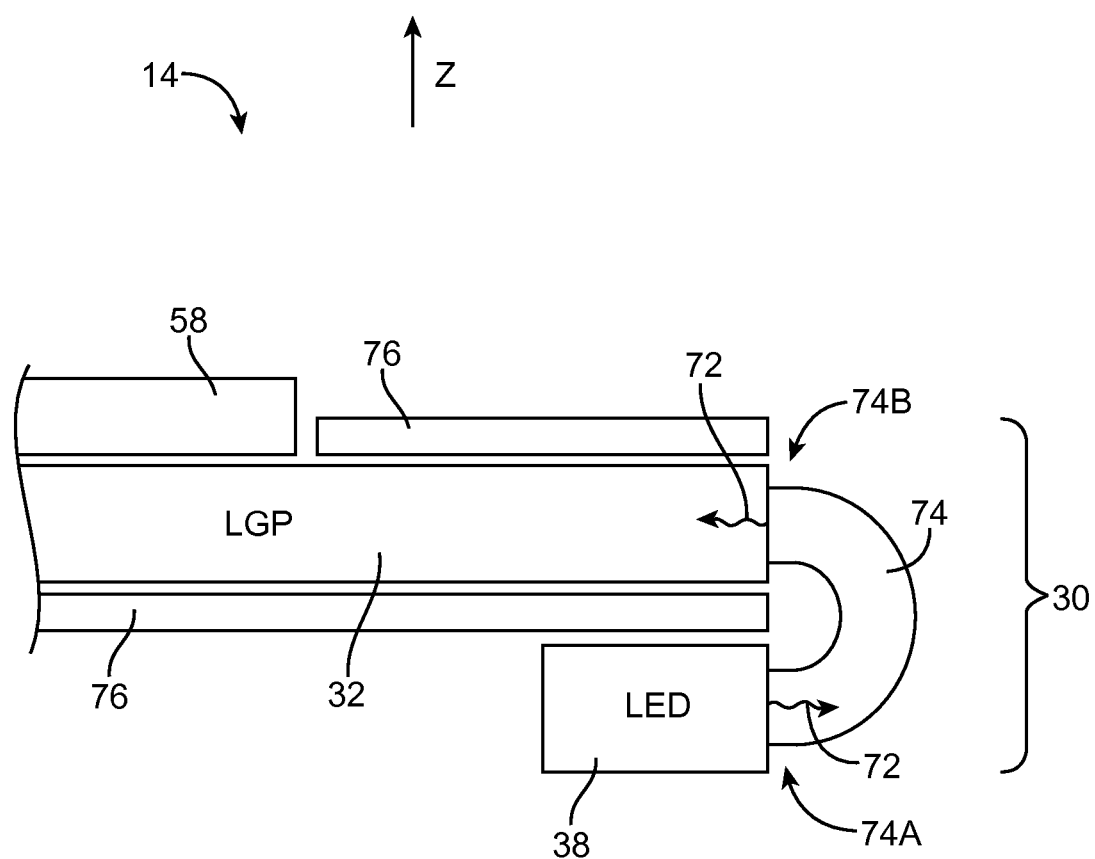
FIG. 8 is a cross-sectional side view of an illustrative backlight arrangement in which a light source is stacked below a light guide plate so that the light source overlaps an edge portion of the light guide plate in accordance with an embodiment of the present invention.

FIG. 8 is a cross-sectional side view of another possible backlight assembly that may be used to provide backlight for display 14. In the example of FIG. 8, light source 38 is be positioned below light guide plate 32 (e.g., on the opposite side of light guide plate 32 as display layers 58) and overlaps an edge portion of light guide plate 32. Light source 38 may emit light 72 into light guide structure 74. Light guide structure 74 may be used to route light 72 from light source 38 to light guide plate 32.

In the example of FIG. 8, light guide structure 74 has a U-shaped bend (e.g., makes a 180° turn) to redirect light 72 (initially directed away from light guide plate 32) towards light guide plate 32. Light 72 may be reflected at the walls of light guide structure 74 and may be guided towards light guide plate 32 by means of total internal reflection. Light 72 that is launched into light guide plate 32 from light guide structure 74 may then be distributed across display layers 58 in direction z to serve as backlight for display 14.

A plurality of light sources 38 may be used to provide backlight for display 14. Light guide structure 74 may provide sufficient mixing distance for light 72 from individual light sources 38 to mix and become uniform as it propagates from end 74A to opposing end 74B of light guide structure 74.

Figure 9:
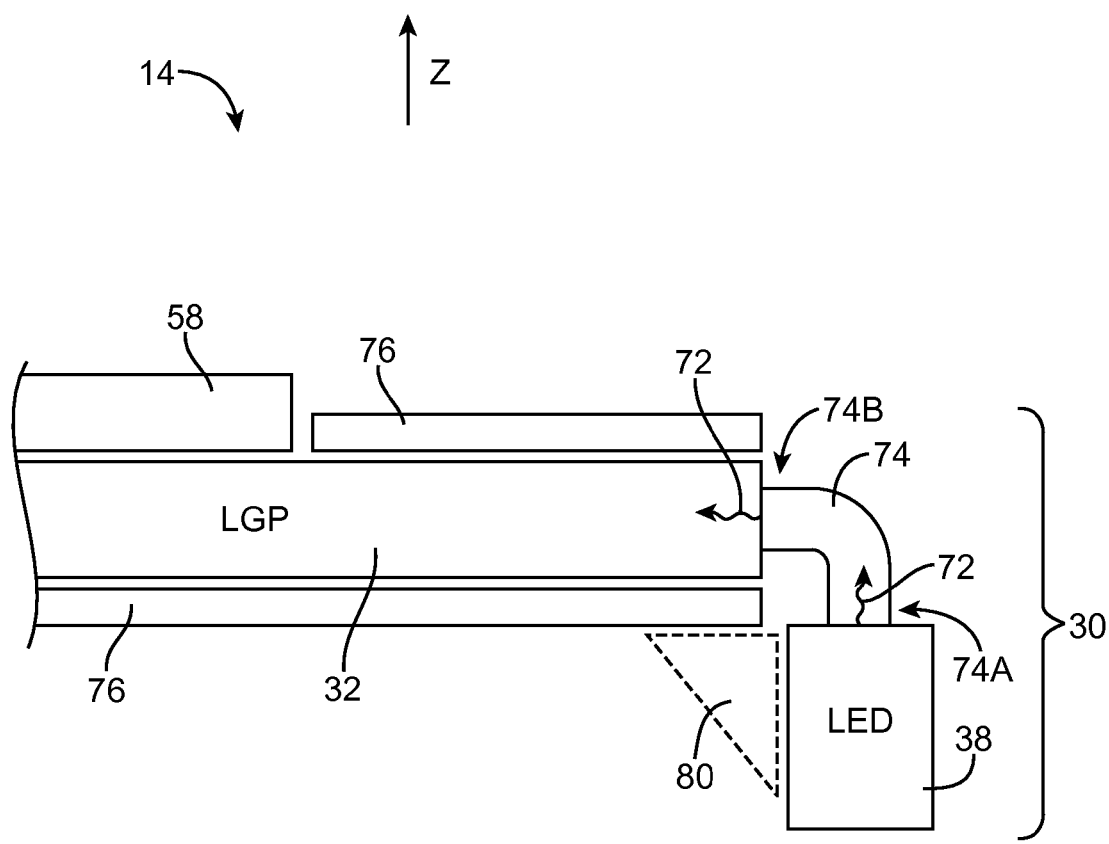
FIG. 9 is a cross-sectional side view of an illustrative backlight arrangement in which a light guide structure with an L-shaped bend is used to couple a light source to a light guide plate in accordance with an embodiment of the present invention.

FIG. 9 is a cross-sectional side view of another possible backlight assembly that may be used to provide backlight for display 14. As shown in FIG. 9, light source 38 may be positioned below light guide plate 32 (e.g., on the opposite side of light guide plate 32 as display layers 58) and may be oriented perpendicular to light guide plate 32. Light source 38 may emit light 72 into light guide structure 74. In the example of FIG. 9, light guide structure 74 has an L-shaped bend (e.g., makes a 90° turn) to redirect light 72 (initially directed perpendicular to light guide plate 32) towards light guide plate 32. Light 72 may be reflected at the walls of light guide structure 74 and may be guided towards light guide plate 32 by means of total internal reflection. Light 72 that is launched into light guide plate 32 from light guide structure 74 may then be distributed across display layer 58 in direction z to serve as backlight for display 14.

A plurality of light sources 38 may be used to provide backlight for display 14. Light guide structure 74 may provide sufficient mixing distance for light 72 from individual light sources 38 to mix and become uniform as it propagates from end 74A to opposing end 74B of light guide structure 74.

If desired, an optional heat sink structure such as heat sink structure 80 may be formed adjacent to light sources 38 and may be used to transfer heat away from light sources 38. Heat sink structure 80 may be formed from a thermally conductive material such as metal. If desired, heat sink structure 80 may be formed as an integral part of support structure 76, may be formed as an integral part of housing 12, or may be formed as a separate structure that transfers heat away from display 14.

Figure 10:
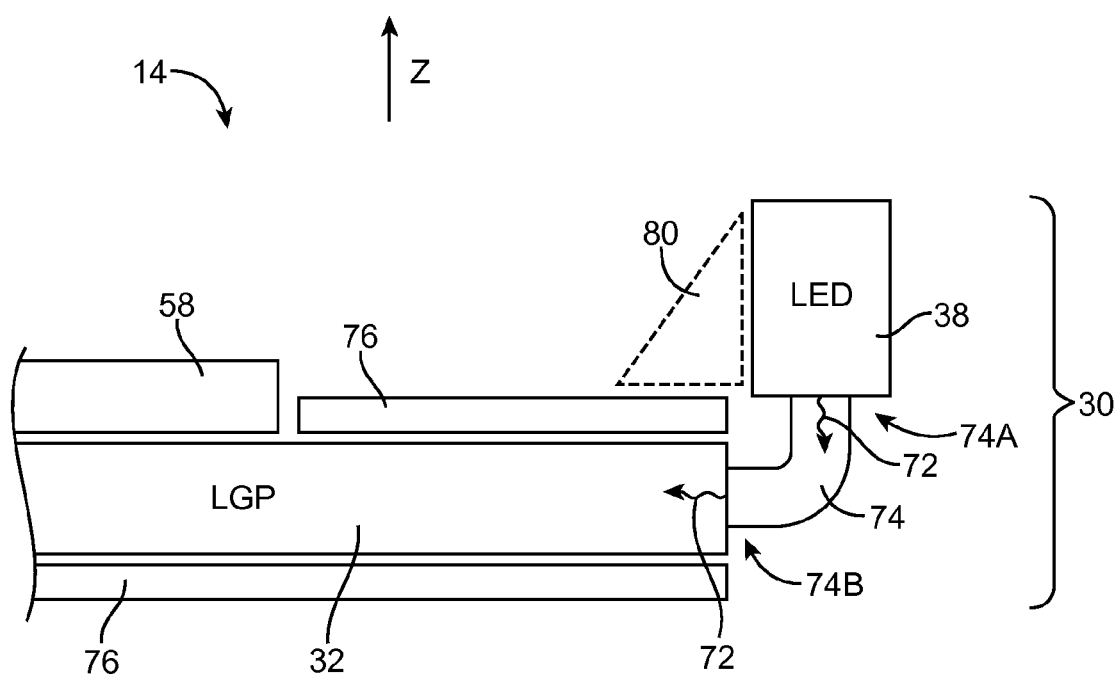
FIG. 10 is a cross-sectional side view of an illustrative backlight arrangement in which a light guide structure with an L-shaped bend is used to couple a light source to a light guide plate in accordance with an embodiment of the present invention.

FIG. 10 is a cross-sectional side view of another possible backlight assembly that may be used to provide backlight for display 14. As shown in FIG. 10, light source 38 may be positioned above light guide plate 32 (e.g., on the same side of light guide plate 32 as display layers 58) and may be oriented perpendicular to light guide plate 32. Light source 38 may emit light 72 into light guide structure 74. In the example of FIG. 10, light guide structure 74 has an L-shaped bend (e.g., makes a 90° turn) to redirect light (initially directed perpendicular to light guide plate 32) towards light guide plate 32. Light 72 may be reflected at the walls of light guide structure 74 and may be guided towards light guide plate 32 by means of total internal reflection. Light 72 that is launched into light guide plate 32 from light guide structure 74 may then be distributed across display layer 58 in direction z to serve as backlight for display 14.

A plurality of light sources 38 may be used to provide backlight for display 14. Light guide structure 74 may provide sufficient mixing distance for light 72 from individual light sources 38 to mix and become uniform as it propagates from end 74A to opposing end 74B of light guide structure 74.

If desired, an optional heat sink structure such as heat sink structure 80 may be formed adjacent to light sources 38 and may be used to transfer heat away from light sources 38. Heat sink structure 80 may be formed from a thermally conductive material such as metal. If desired, heat sink structure 80 may be formed as an integral part of support structure 76, may be formed as an integral part of housing 12, or may be formed as a separate structure that transfers heat away from display 14.

Figure 11:
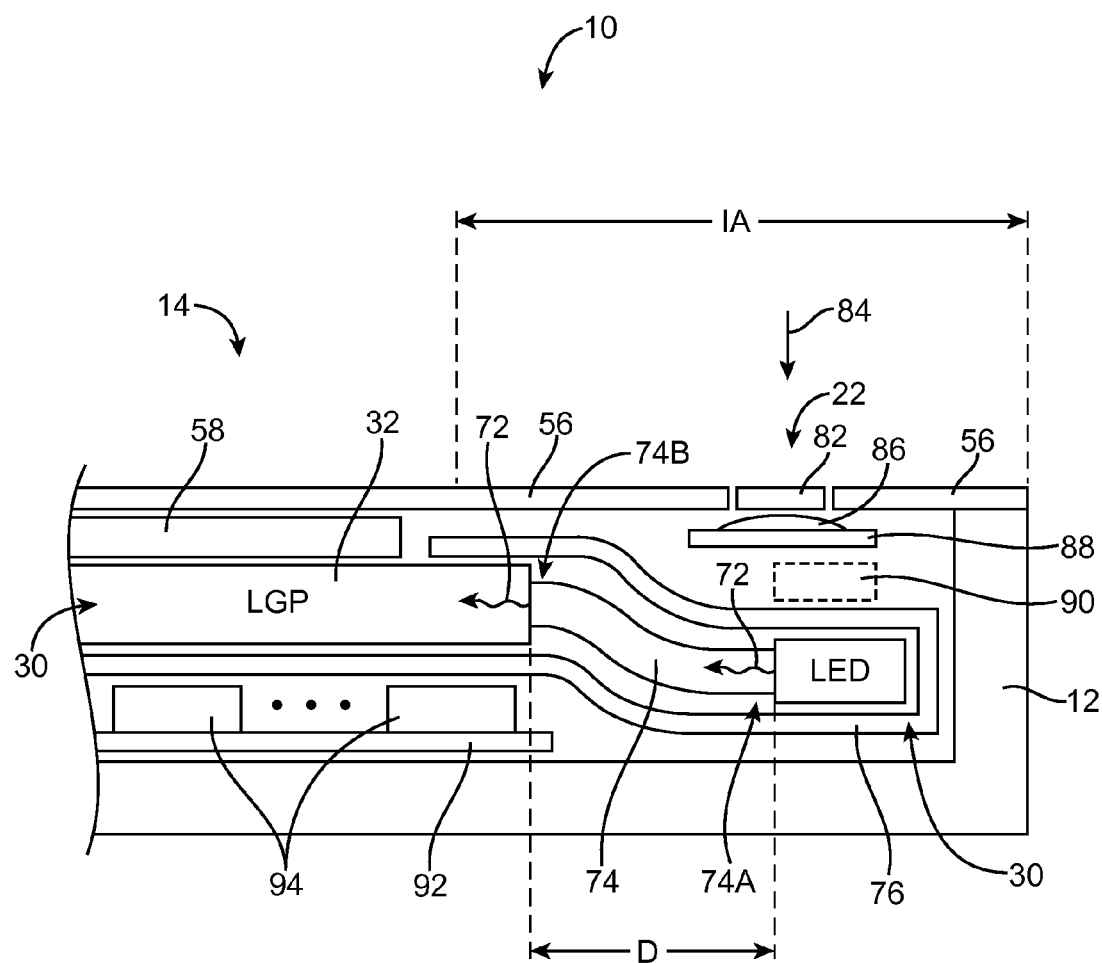
FIG. 11 is a cross-sectional side view of an illustrative display that has been mounted in a housing of an electronic device in a configuration in which an electronic component overlaps a light source in accordance with an embodiment of the present invention.

FIG. 11 is a cross-sectional side view of another possible backlight assembly that may be used to provide backlight for display 14. As shown in FIG. 11, light guide structures 30 and display layers 58 may be mounted within housing 12 and may be covered by a cover layer such as cover layer 56.

If desired, one or more printed circuits such as printed circuit 92 may be located below display 14. Printed circuit 92 may be a rigid printed circuit board formed from material such as fiberglass-filled epoxy (e.g., FR4), may be a flexible printed circuit ("flex circuit") formed from one or more flexible sheets of polymer such as polyimide, or may be formed from materials such as ceramic, plastic, glass, etc. If desired, printed circuit 92 may be formed from a combination of rigid and flexible layers (sometimes referred to as a "rigid-flex" printed circuit). Integrated circuits, discrete components such as resistors, capacitors, and inductors, and other electronic components such as components 94 may be mounted to printed circuit 92. If desired, components 94 may be used to supply control signals to light sources 38 (e.g., similar to components 64 of FIG. 6).

As shown in FIG. 11, light source 38 may be laterally spaced from the edge of light guide plate 32 by a distance D. Light guide structure 74 may be used to guide light 72 from light source 38 towards light guide plate 32 by means of total internal reflection. Light 72 that is launched into light guide plate 32 from light guide structure 74 may then be distributed across display layers 58 in direction z to serve as backlight for display 14. Light guide structure 74 may provide sufficient mixing distance for light 72 from individual light sources 38 to mix and become uniform as it propagates from end 74A to opposing end 74B of light guide structure 74.

If desired, light source 38 may be offset with light guide plate 32. For example, light guide plate 32 may lie in a plane, and light source 38 may be located outside of that plane (e.g., may be located above or below that plane). This may allow light source 38 to be positioned in a space-efficient location, such as directly above or directly below another component in device 10. For example, light source 38 may be located below a button such as button 22 of device 10.

Button 22 may have a button member such as button member 82. When a user presses the exterior of button member 82 in direction 84, button member 82 may press against a dome switch such as dome switch 86, thereby activating the switch (e.g., shorting internal switch terminals together to close the switch). Dome switches such as dome switch 86 may, if desired, be mounted to printed circuits such as printed circuit 88. Other types of switches may be used if desired, such as switches with spring-based biasing members or other biasing structures that bias button members such as button member 82. The use of a dome switch with a dome-shaped biasing structure is merely illustrative.

Light sources 38 may be located above or below other electronic device components such as internal component 90. This type of configuration in which light sources 38 are located directly above or directly below other device components (such as button 22 and/or component 90) may be space-efficient and may minimize the amount of inactive display area around the border of display 14. For example, button member 22 may be located in an inactive portion (e.g., inactive area IA) of display 14. By positioning light sources 38 directly below button member 22, no additional inactive display area is required to accommodate light sources 38.

Figure 12:
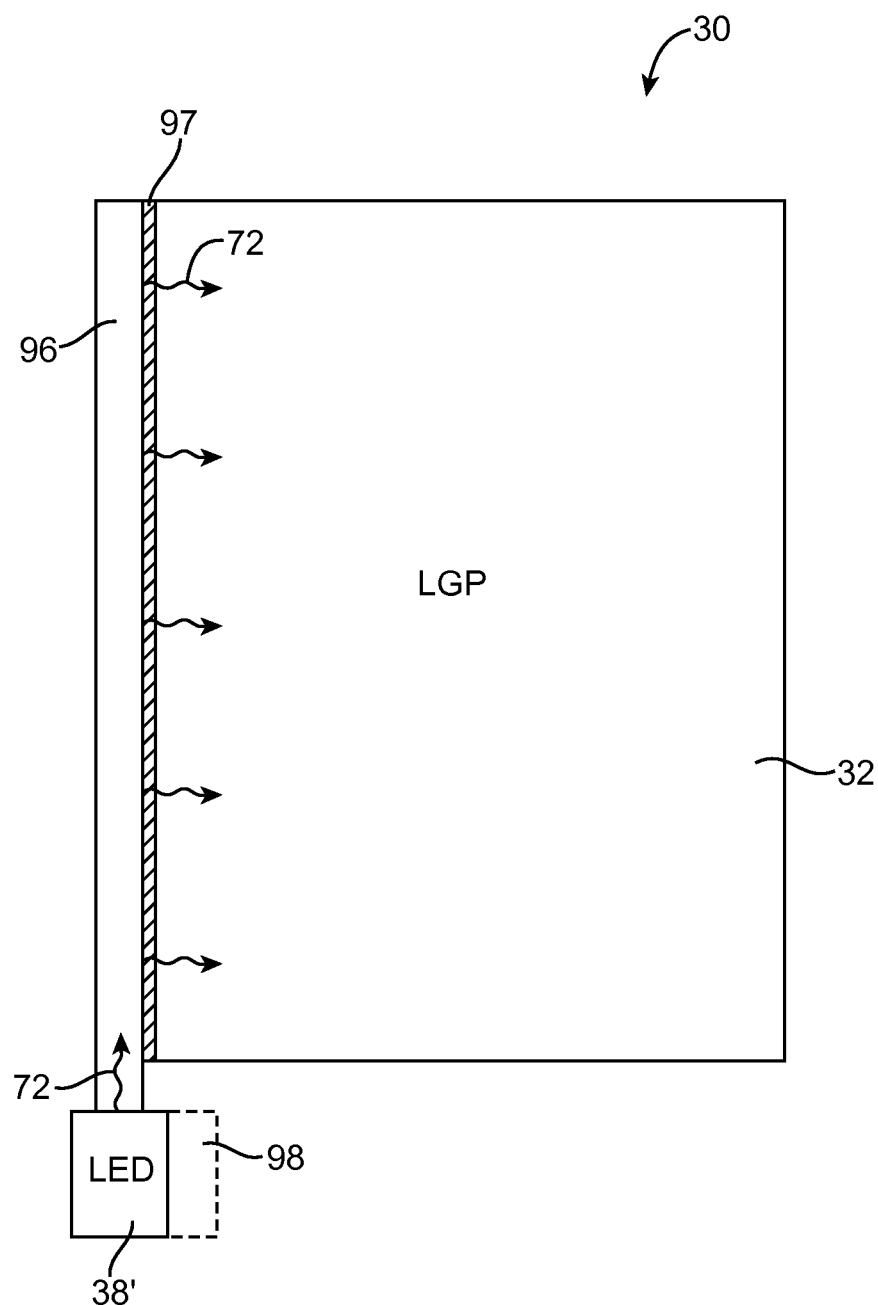
FIG. 12 is a top view of an illustrative backlight arrangement in which a light guide structure is used to guide light from a light source to a light guide plate in accordance with an embodiment of the present invention.

FIG. 12 is a top view of another possible backlight assembly that may be used to provide backlight for display 14. As shown in FIG. 12, a light source such as centralized light source 38' may be used to provide backlight for display 14. Centralized light source 38' may be formed from one, two, three, or more than three light-emitting diodes that are powerful enough to provide sufficient backlight for display 14. An auxiliary light guide structure such as light guide structure 96 may be used to distribute light 72 from centralized light source 38' across the edge of light guide plate 32.

Light guide structure 96 may be formed as an integral part of light guide plate 32 or may be formed as a separate structure that is coupled to the edge of light guide plate 32. Light guide structure 96 may be formed from material such as plastic or glass (as examples). Light guide structure 96 may be formed from a single material (e.g., a single glass or plastic material) or may have an inner portion (e.g., a higher index of refraction portion) that is coated with an outer portion (e.g., a lower index of refraction portion). Light guide structure 96 may be formed from a bundle of fiber-optic cables, may be formed from a single fiber-optic structure, may be formed from an acrylic bar structure, or may be formed from any suitable transparent material that will disperse light from centralized light source 38' into the edge of light guide plate 32. Light 72 may be reflected at the walls of light guide structure 96 and may be guided towards light guide plate 32 by means of total internal reflection. Light 72 that is launched into light guide plate 32 from light guide structure 96 may then be distributed across display layers (FIG. 5) to serve as backlight for display 14.

Any suitable fabrication technique may be used in forming light guide structure 96. For example, light guide structure 96 and light guide plate 32 may form parts of a single integral structure (e.g., a single molded or machined piece of polymer or other suitable material). In this type of configuration, some or all of light guide structure 96 may be formed as an integral part of light guide plate 32. A groove or other recess may be used to separate light guide structure 96 and light guide plate 32. The recess may help confine light to light guide structure 96. Light leakage promotion features may be formed along the edge of light guide structure 96 that is formed from the recess and may be used to release the confined light into light guide plate 32.

With another suitable arrangement, light guide structure 96 and light guide plate 32 may be formed using double-shot molding. With this type of fabrication technique, a first shot of material is injected into a mold to form a first structure (e.g., to form light guide plate 32). A second shot of material is then injected into the mold form a second structure (e.g., to form an integrally molded light guide structure 96 along the edge of light guide plate 32). Light guide structure 96 and light guide plate 32 may be formed from the same type of material or may be formed from different types of materials. If desired, the materials that are used to form the first and second shots may be polymers with different respective indices of refraction.

If desired, light guide structure 96 may be pressed up against light guide plate 32 or may be bonded to light guide plate 32 using adhesive. For example, a transparent adhesive such as transparent adhesive 97 (e.g., epoxy) may be interposed between light guide structure 96 and light guide plate 32 and may be used to attach light guide structure 96 to the edge of light guide plate 32.

If desired, an optional heat sink structure such as heat sink structure 98 may be formed adjacent to centralized light source 38' and may be used to transfer heat away from centralized light source 38'. Heat sink structure 98 may be formed from a thermally conductive material such as metal. If desired, heat sink structure 98 may be formed as an integral part of surrounding housing structures or other structures or may be formed as a separate structure that transfers heat away from display 14.

Figure 13:
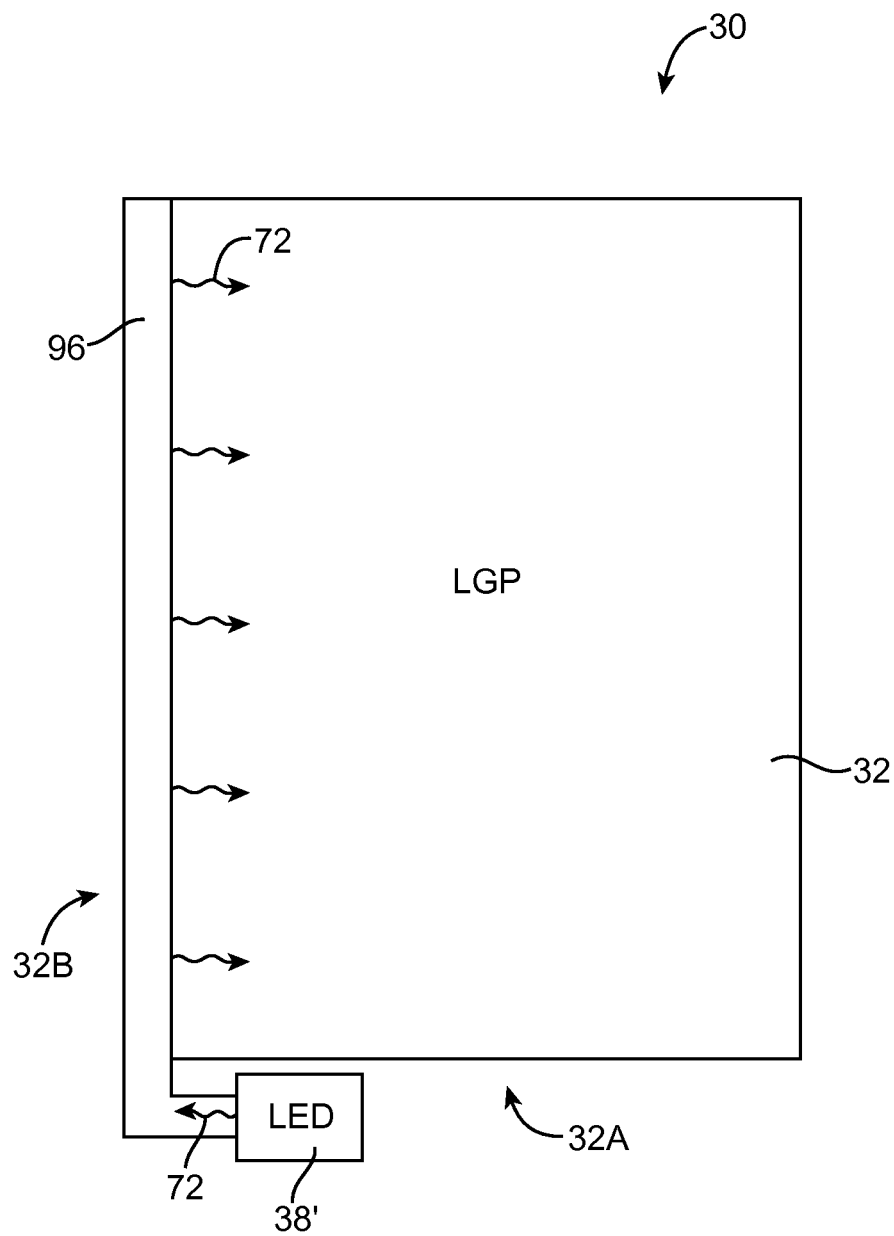
FIG. 13 is a top view of an illustrative backlight arrangement in which a light guide structure has an L-shaped bend to wrap around a corner of a light guide plate and is used to guide light from a light source to the light guide plate in accordance with an embodiment of the present invention.

FIG. 13 is a top view of another possible backlight assembly that may be used to provide backlight for display 14. As shown in FIG. 13, a centralized light source such as centralized light source 38' may be used to provide backlight for display 14. An auxiliary light guide structure such as light guide structure 96 may be used to distribute light 72 from centralized light source 38' across the edge of light guide plate 32.

As shown in FIG. 13, centralized light source 38' may be adjacent to a first edge such as edge 32A of light guide plate 32, and light guide structure 96 may be adjacent to a second edge such as edge 32B of light guide plate 32. Light guide structure 96 may have an L-shaped bend to wrap around a corner of light guide plate 32 (e.g., may form a 90° bend around a corner of light guide plate 32) to redirect light 72 (initially directed away from light guide plate 32) towards light guide plate 32. Light 72 may be reflected at the walls of light guide structure 96 and may be guided towards light guide plate 32 by means of total internal reflection. Light 72 hat is launched into light guide plate 32 from light guide structure 96 may then be distributed across display layers 58 (FIG. 5) to serve as backlight for display 14.

Figure 14:
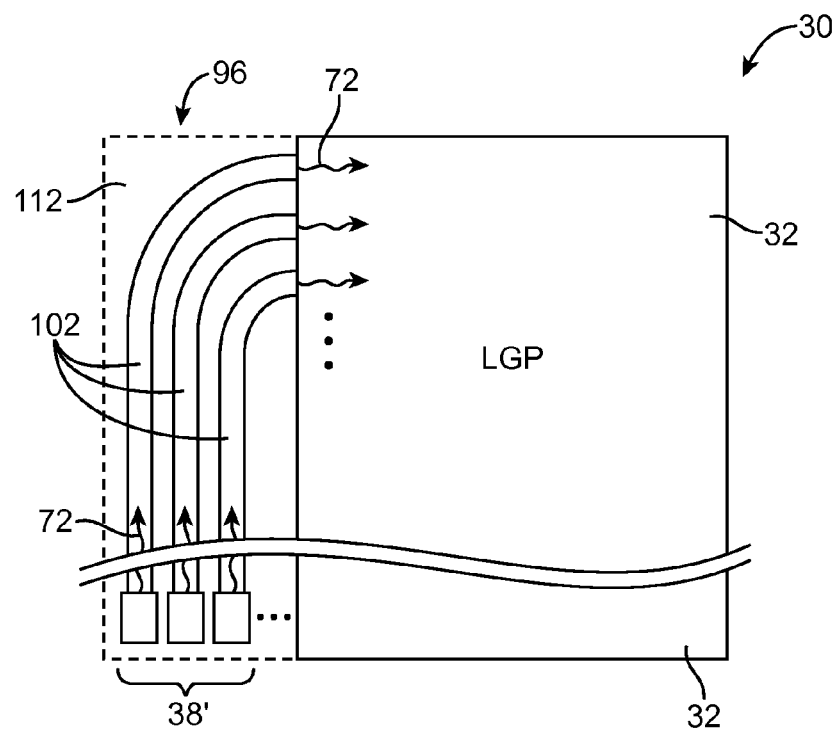
FIG. 14 is a top view of an illustrative backlight arrangement of the type shown in FIGS. 11 and 12 in which a light guide structure is formed from a plurality of optical waveguides (light guides) in accordance with an embodiment of the present invention.

FIG. 14 is a top view of illustrative backlight structures 30 showing how light guide structure 96 may be formed from a plurality of optical waveguides (light guides) such as optical waveguides 102. As shown in FIG. 14, light 72 may propagate through optical waveguides 102 and may be launched into the edge of light guide plate 32. Each optical waveguide 102 may be coupled to a respective portion of light guide plate 32 so that light 72 is distributed evenly along the edge of light guide plate 32.

Optical waveguides 102 may be formed from polymers such as epoxy, may be formed from optical fibers, or may be formed from other suitable materials. Optical waveguides 102 may have a circular cross-sectional shape, a square cross-sectional shape, a rectangular cross-sectional shape, an oval cross-sectional shape, a shape with curved edges, a shape with straight edges, a shape with a combination of curved and straight edges, or other suitable cross-sectional shapes. If desired, optical waveguides 102 may be mounted to a support structure such as support structure 112 (e.g., a rigid or flexible glass or plastic substrate or a layer of resin) or may be mounted directly within housing structures 12 or other support structures.

Figure 15:
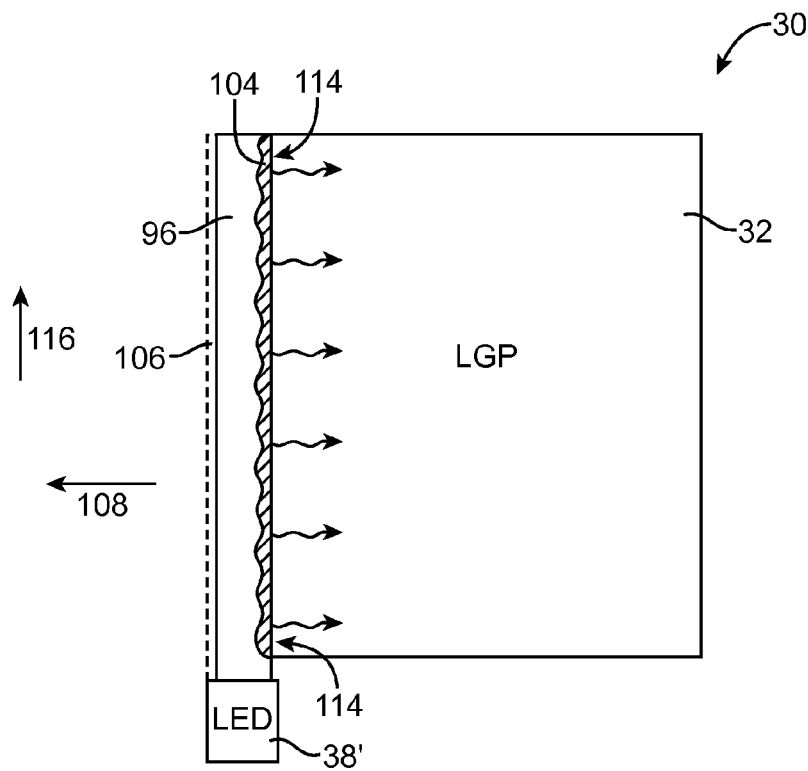
FIG. 15 is a top view of an illustrative backlight arrangement of the type shown in FIGS. 11 and 12 in which a light guide structure is provided with light leakage promotion structures in accordance with an embodiment of the present invention.

FIG. 15 is a top view of illustrative backlight structures 30 showing how light guide structure 96 may be provided with light leakage promotion structures such as light leakage promotion structures 104 to help scatter light out of light guide structure 96 and into light guide plate 32. For example, light leakage promotion structures 104 may be formed by roughening or forming notches in the surface of light guide structure 96 that is adjacent to light guide plate 32 (e.g., surface 114). As light propagates within light guide structure 96, the roughened texture of surface 114 may promote light leakage from light guide structure 96 into light guide plate 32.

If desired, an optional reflector such as reflector 106 may be formed adjacent to light guide structure 96 on the opposite side of roughened surface 114. Any light that escapes from light guide structure 96 in direction 108 may be reflected back towards light guide plate 32 by reflector 106. Reflector 106 may be formed from a sheet of white plastic, metal, or other reflective material.

As light 72 propagates within light guide structure 96 (e.g., in direction 116) and the distance from centralized light source 38' increases, the intensity of light 72 may decrease. To ensure that light 72 is evenly distributed along the edge of light guide plate 32, it may be desirable to have increased light leakage from portions of light guide structure 96 that receive light of lower intensity.

To increase light leakage in portions of light guide structure 96 that are farther from centralized light source 38', light leakage promotion structures 104 may be non-uniform along the length of surface 114. For example, the size, density, and/or shape of light leakage promotion structures 104 on surface 114 of light guide structure 96 may change as the distance from centralized light source 38' increases (e.g., the degree of roughness on surface 114 may increase along direction 116). This type of configuration may ensure that light is uniformly distributed along the edge of light guide plate 32.

FIGS. 16-20 are illustrative examples of ways in which light guide structure 96 may be provided with non-uniform light leakage promotion structures.

Figure 16:
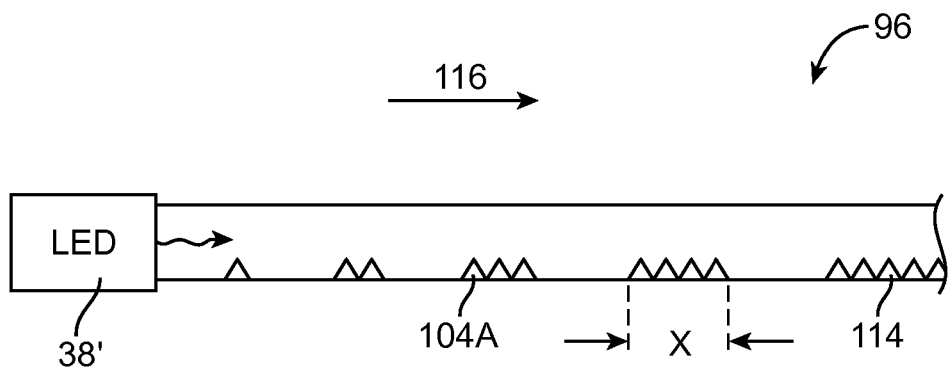
FIG. 16 is a top view of an illustrative backlight arrangement in which a light guide structure is provided with light leakage promotion structures that vary in density in accordance with an embodiment of the present invention.

As shown in FIG. 16, light leakage promotion features 104A may include a series of notches or roughened portions formed on surface 114 of light guide structure 96. Each notch or roughened portion 104A may have a width such as width X. The width X of roughened portions 104A may increase along direction 116. If desired, the density of light leakage promotion structures 104A may also increase along the length of light guide structure 96 (e.g., the amount of light leakage promotion structures 104A in a given area of surface 114 may increase along direction 116). Wider roughened portions and/or greater densities of light leakage promotion structures may promote increased light leakage in portions of light guide structure 96 that are farther away from centralized light source 38'.

Figure 17:
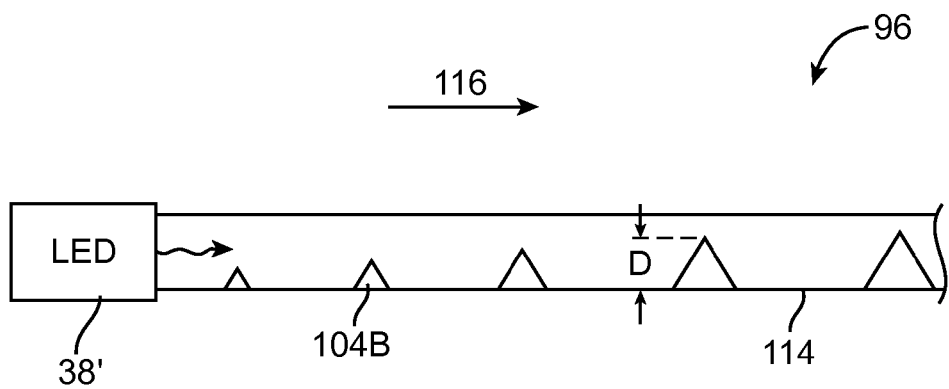
FIG. 17 is a top view of an illustrative backlight arrangement in which a light guide structure is provided with light leakage promotion structures that vary in size in accordance with an embodiment of the present invention.

FIG. 17 is another example of how light leakage promotion structures 104 may be non-uniform along the length of light guide structure 96. In the example of FIG. 17, light leakage promotion structures 104B may vary in size along the length of light guide structure 96. For example, each roughened portion or notch 104B may have a depth such as depth D. The depth D of notches 104B may increase along direction 116. Deeper roughened portions (e.g., light leakage promotion structures of greater size) may promote increased light leakage in portions of light guide structure 96 that are farther away from centralized light source 38'.

Figure 18:
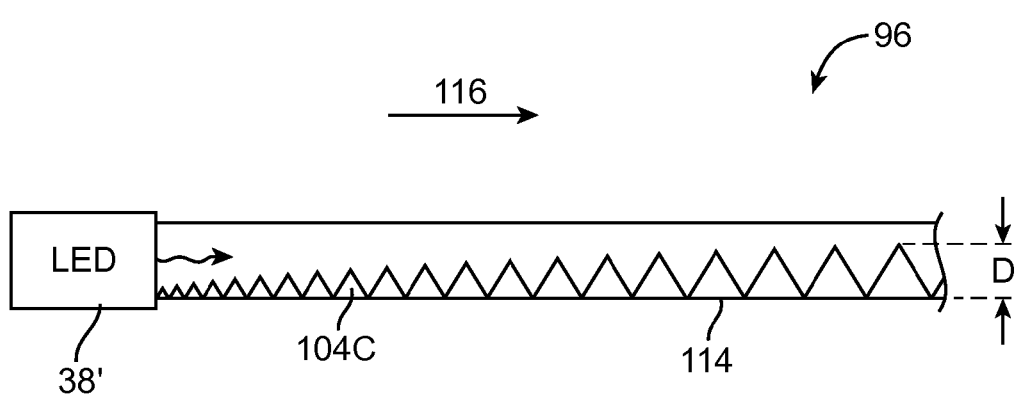
FIG. 18 is a top view of an illustrative backlight arrangement in which a light guide structure is provided with light leakage promotion structures having one or more properties that vary gradually along the length of the light guide structure in accordance with an embodiment of the present invention.
Figure 19:
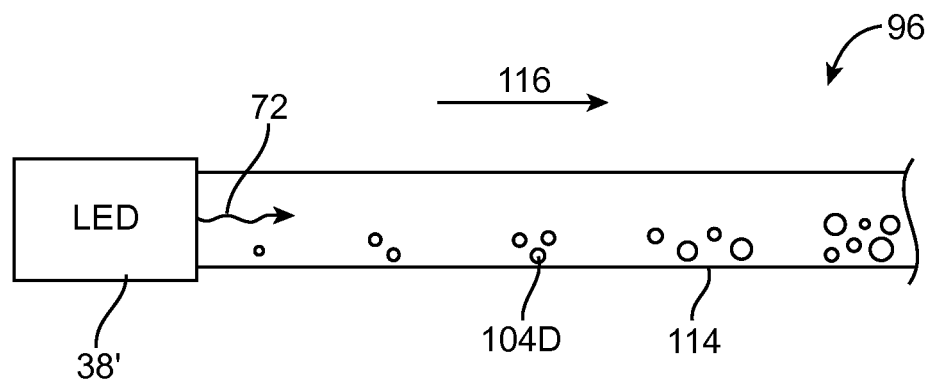
FIG. 19 is a top view of an illustrative backlight arrangement in which a light guide structure is provided with light leakage promotion structures formed from embedded scattering structures in accordance with an embodiment of the present invention.

FIG. 18 is another example of how light leakage promotion structures may be non-uniform along the length of light guide structure 96. As shown in FIG. 18, light leakage promotion structures 104C may be formed continuously along surface 114 of light guide structure 96. Light leakage promotion structures 104C may have one or more properties that change smoothly along the length of light guide structure 96 (e.g., light leakage promotion structures 104C may be formed from structure types that vary following a linear or curved gradient). For example, depth D of notches 104C may increase gradually along direction 116. Other properties of light leakage promotion structures 104C that may vary gradually along the length of light guide structure 96 include size, shape, density, and/or material properties. Light leakage promotion structures 104C may be used to increase light leakage in portions of light guide structure 96 that are farther away from centralized light source 38'.

If desired, light leakage promotion structures 104 in light guide structure 96 may be formed from embedded scattering structures such as particles, bubbles, and/or voids. As shown in the illustrative arrangement of FIG. 19, light leakage promotion structures 104D may be formed from bubbles filled with air, particles formed from materials with an index of refraction that is greater than or less than the index of refraction of light guide structure 96, or particles or voids with other properties that scatter light 72 from light source 38' into light guide plate 32 (FIG. 15). Light leakage promotion structures 104D may vary in size, shape, density, and/or material properties (e.g., index-of-refraction) along direction 116 to ensure that light is evenly distributed across surface 114 into light guide plate 32.

Figure 20:
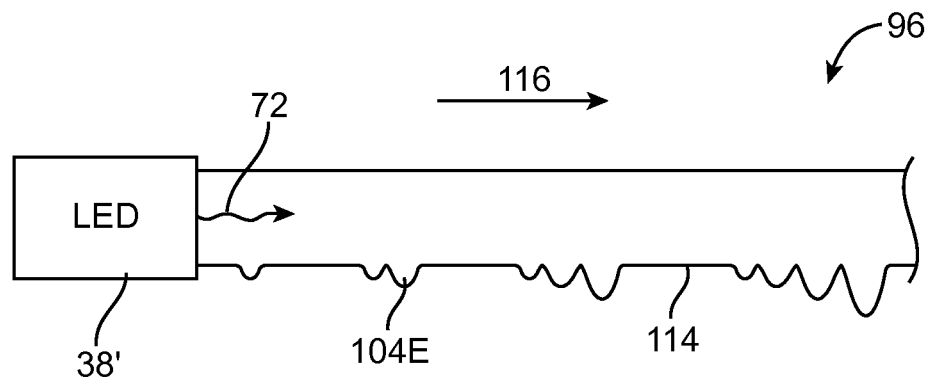
FIG. 20 is a top view of an illustrative backlight arrangement in which a light guide structure is provided with light leakage promotion structures formed from protrusions in accordance with an embodiment of the present invention.

If desired, light leakage promotion structures 104 in light guide structure 96 may be formed from other structures such as protrusions. As shown in FIG. 20, a series of protrusions such as protrusions 104E may be formed on surface 114 of light guide structure 96 and may be used to scatter light 72 from light source 38' into light guide plate 32. Protrusions 104E may be formed as integral portions of light guide structure 96 or may be separate structures that are formed on surface 114 of light guide structure 96. Protrusions 104E may vary in size, shape, density, and/or material properties along direction 116 to ensure that light is evenly distributed across surface 114 into light guide plate 32.

The foregoing is merely illustrative of the principles of this invention and various modifications can be made by those skilled in the art without departing from the scope and spirit of the invention. The foregoing embodiments may be implemented individually or in any combination.

What is claimed is:
1. An electronic device, comprising:
 a housing having a rear surface;
 a display mounted in the housing;
 a button adjacent to the display, wherein the display includes an active area surrounded by an inactive area and wherein the button is located in the inactive area; and
 a backlight assembly configured to provide backlight illumination for the display, wherein the backlight assembly includes:
  a light guide plate having a surface from which the backlight illumination is provided to the display,
  a light guide structure coupled to the light guide plate, and
  a plurality of light sources coupled to the light guide structure, wherein the light guide structure is configured to guide light from the light sources to the light guide plate via total internal reflection, wherein the light guide structure comprises opposing upper and lower curved surfaces that curve away from the button to accommodate the button, and wherein at least one of the light sources is interposed between the button and the rear surface of the housing.

2. The electronic device defined in claim 1 wherein the light guide plate is integral with the light guide structure.

3. The electronic device defined in claim 2 wherein the plurality of light sources comprises a plurality of light-emitting diodes.

4. The electronic device defined in claim 1 wherein the light guide structure comprises a transparent polymer.

5. The electronic device defined in claim 1 wherein the button and the light guide structure are separated by a gap.

6. The electronic device defined in claim 1 further comprising:
 a chassis in which the plurality of light sources are mounted.

7. The electronic device defined in claim 6 wherein the chassis comprises a metal chassis.

8. The electronic device defined in claim 6 wherein the chassis comprises thermally conductive material that conducts heat away from the plurality of light sources.

9. The electronic device defined in claim 6 wherein the light guide plate lies in a plane and wherein the at least one light source is located outside of the plane.

10. An electronic device, comprising:
 a housing having a rear surface;
 a display mounted in the housing, wherein the display includes an active area surrounded by an inactive area;
 a button located in the inactive area of the display; and
 a backlight assembly configured to provide backlight illumination for the display, wherein the backlight assembly includes:
  a light guide plate having a surface from which the backlight illumination is provided to the display;
  a light guide structure coupled to the light guide plate; and
  a plurality of light sources coupled to the light guide structure, wherein the light guide structure is configured to guide light from the light sources to the light guide plate via total internal reflection, wherein the light guide structure comprises opposing upper and lower curved surfaces that curve away from the button to accommodate the button, wherein at least one of the light sources is interposed between the button and the rear surface of the housing, and wherein the at least one light source is located directly below the button in the inactive area.

11. The electronic device defined in claim 10 wherein the light guide plate is integral with the light guide structure.

12. The electronic device defined in claim 11 wherein the plurality of light sources comprises a plurality of light-emitting diodes.

13. The electronic device defined in claim 10 wherein the light guide structure comprises a transparent polymer.

14. The electronic device defined in claim 10 wherein the button and the light guide structure are separated by a gap.

15. The electronic device defined in claim 10 further comprising:
   a chassis in which the plurality of light sources are mounted.

16. The electronic device defined in claim 15 wherein the chassis comprises a metal chassis.

17. The electronic device defined in claim 15 wherein the chassis comprises thermally conductive material that conducts heat away from the plurality of light sources.

18. The electronic device defined in claim 15 wherein the light guide plate lies in a plane and wherein the at least one light source is located outside of the plane.

* * * * *